Patented Oct. 31, 1939

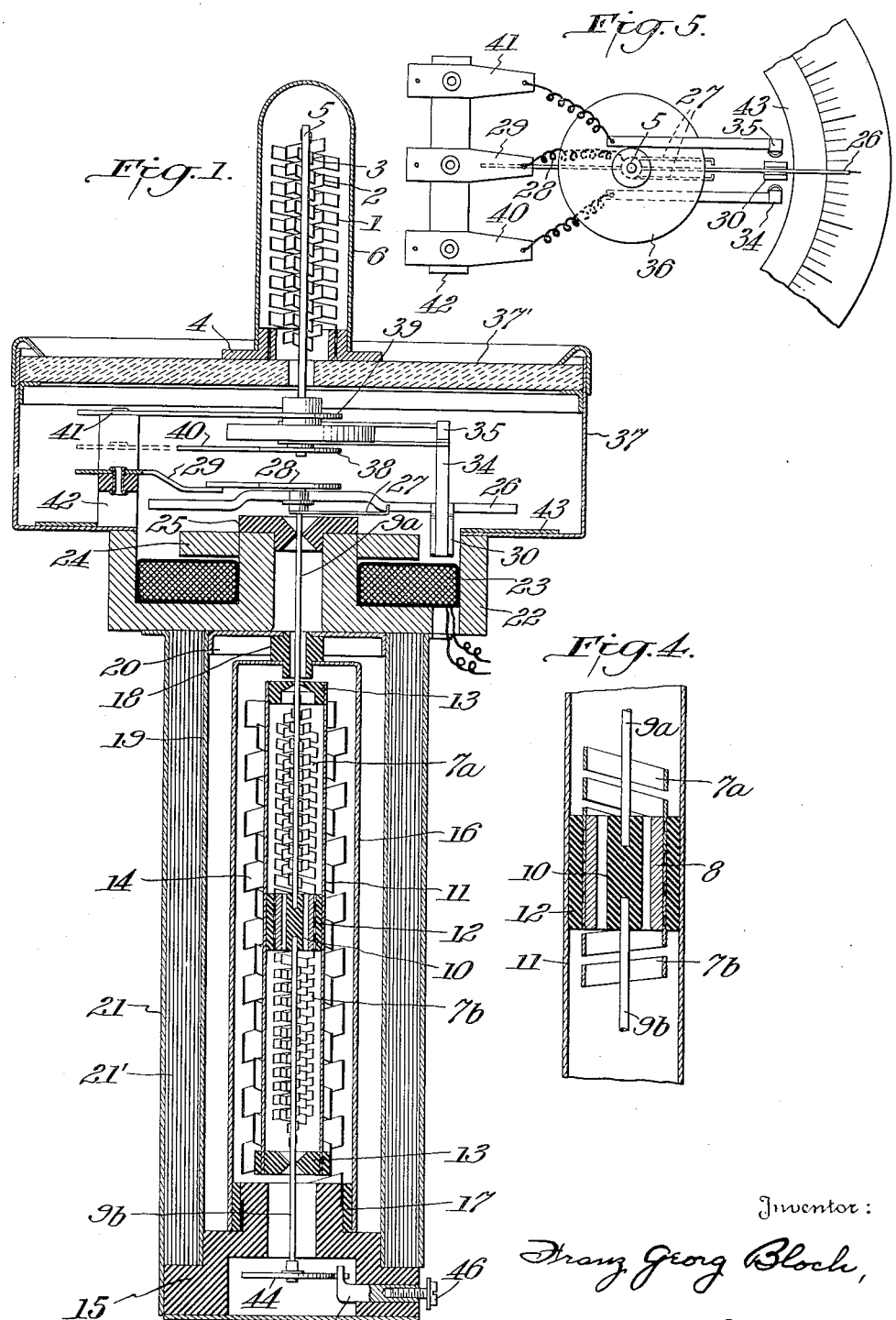

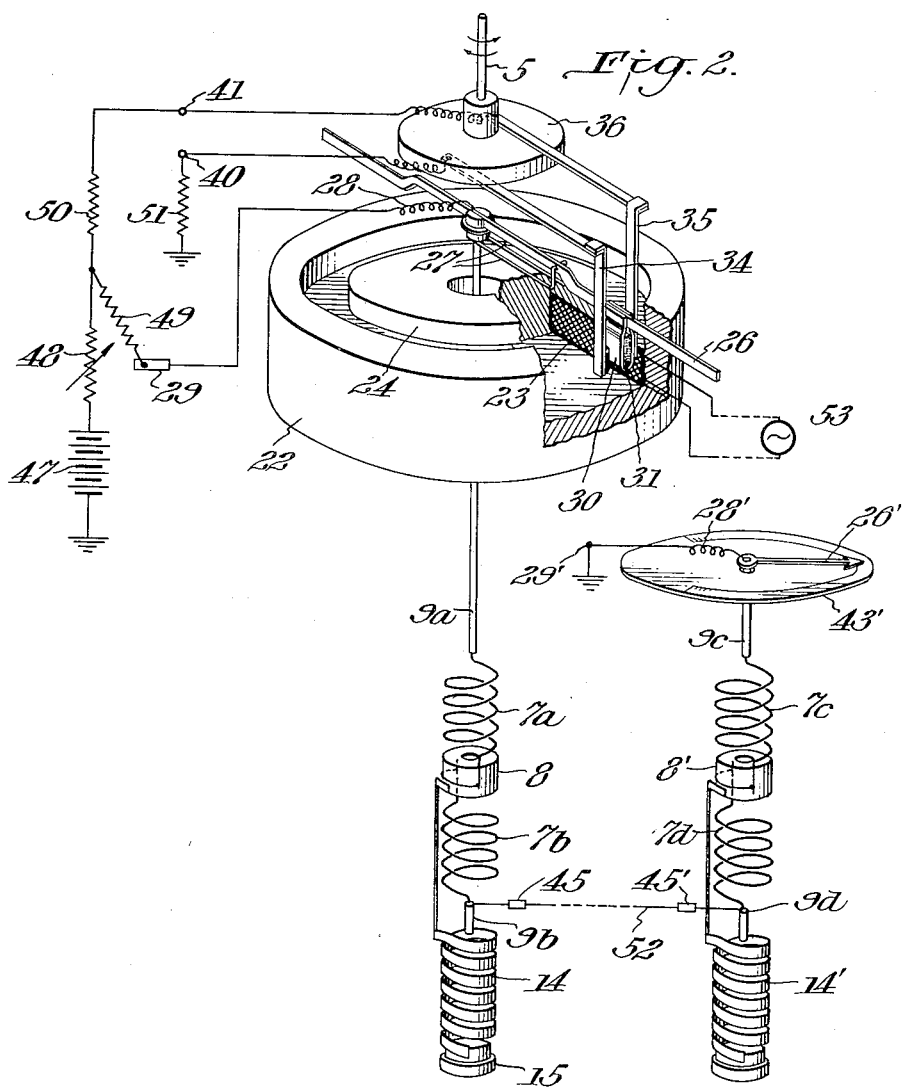
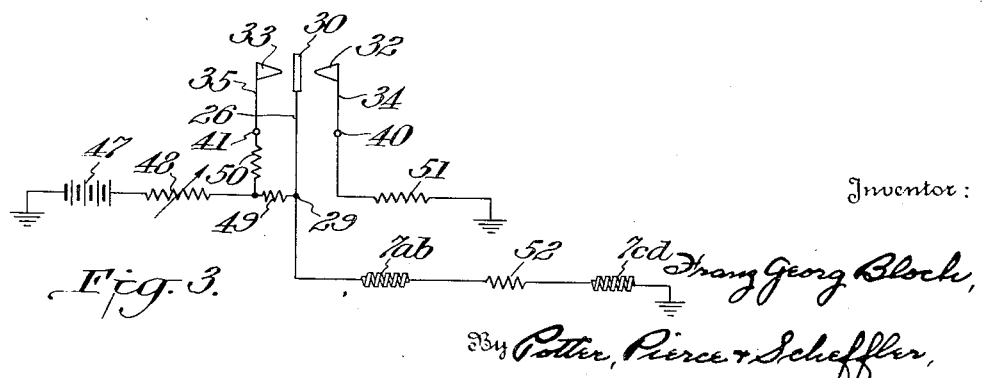

2,177,799

UNITED STATES PATENT OFFICE 2,177,799

MOTION TRANSMITTING APPARATUS

Franz Georg Bloch, Leitmeritz, Czechoslovakia

Application January 9, 1937, Serial No. 119,855
In Czechoslovakia January 17, 1936

18 Claims. (Cl. 177—351)

This invention relates to motion transmission apparatus and particularly to electrical apparatus of the type including bimetallic transmitter and receiver elements in a series circuit in which the current flow is regulated by the position of some prime mover with respect to the transmitting element.

Telemetric systems of the bimetallic element type have been proposed but the bimetallic elements were relatively heavy strips or plates capable of resisting substantial forces developed by the prime mover, and the elements were heated indirectly by resistance windings. These mechanical and electrical features resulted in a relatively slow and intermittent action as the transmitter element opened and closed a switch in the heating circuit. Such prior devices have not operated with high accuracy and are not ːpted for use with prime movers of high sensitivity such as galvanometers, precision bimetallic thermometers and other measuring instruments.

An object of this invention is to provide electrical motion transmitting of the bimetallic element type which may be used with prime movers of high sensitivity. An object is to provide motion transmitting apparatus of the type stated in which the bimetallic elements have the form of coils, for responding to or producing a rotary motion, and are directly heated by the flow of current therethrough.

Another object is to provide apparatus for the transmission of a geometrical magnitude, such as the angular displacement of an instrument pointer, the apparatus including a bimetallic system which is not mechanically connected to the instrument pointer and which exerts a negligible pressure upon the same.

Other objects are to provide motion transmitting apparatus of the type stated which includes a novel electrical circuit and novel contact structures for controlling the heat-transfer to the bimetallic elements by varying the magnitude of the current flow.

These and other objects and advantages of the invention will be apparent from the following specification when taken with the accompanying drawings in which:

Fig. 1 is an enlarged longitudinal section through a prime mover, specifically a thermometer, and a transmitter embodying the invention;

Fig. 2 is a schematic view of the complete system; the contact structure and arc-preventing system of Fig. 1 being shown in perspective and with parts in section;

Fig. 3 is a circuit diagram of the electrical elements of the apparatus;

Fig. 4 is an enlarged fragmentary view of the supported ends and associated elements of the bimetallic members of Fig. 1; and Fig. 5 is a fragmentary plan view of the contacts and graduated scale of the transmitter.

The particular embodiment which is illustrated in the drawings comprises a distant-reading thermometer, i. e. the prime mover is a sensitive bimetallic thermometer such as described and claimed in my prior Patent No. 1,970,219, granted August 14, 1934. The thermometer will be described in detail to facilitate an understanding of the construction and operation of the bimetallic elements of similar design that are included in the motion transmitting apparatus.

The thermometer comprises three co-axially arranged coils or spring helixes of bimetallic strip material, such as steel and copper or bronze. The outer coil 1 is a right-hand helix to which the upper end of the intermediate left-hand helix 2 is secured, and the lower end of the inner right-hand helix 3 is supported by the corresponding end of helix 2. The lower end of coil 1 is secured to supporting collar or bushing 4, and an axial staff 5 is secured to the upper end of the inner coil. A protective covering 6 may be attached to bushing 4 to house the bimetallic unit. As described in my prior patent, the temperature-produced displacements of the relatively free ends of the coils are cumulative and the staff 5 is supported solely by the bimetallic coils. The angular displacements of the staff 5 are therefore relatively large for small temperature changes, and the response of the staff to temperature variations is quick and accurate as the bimetallic strips are long and thin but provide a "floating" or friction-free support for the staff.

The bimetallic units 7a, 7b of the motion transmitting system are preferably of the described multiple coil type but, as illustrated, differ as to size and shape from the bimetallic coils of the thermometer. The temperature-sensitive units 7a, 7b are symmetrically arranged at opposite ends of the coil supporting sleeve 8 and the adjacent ends of the outer coils are supported by and electrically connected through the sleeve 8. Each unit has an axial stem 9a, 9b, respectively, mounted on the inner coil and the stems are connected by the insulating piece 10 to form a single staff for the balanced pair of thermal units. The thermal units tend to rotate the staff in the same direction upon temperature changes and thus develop double the torque of a single unit. Further, the double unit construction provides a balanced friction-free support for the staff which projects at each end well beyond the thermal units.

The bimetallic structure is housed within a cylinder 11 of thin sheet aluminum or the like and is supported by an insulating sleeve 12 that is attached, by cement or the like, to the coil support 8 and the cylinder. Bushings 13, which may be of the instrument jewel type, are mounted in the ends of the cylinder to form friction-free guides for the staff of the bimetallic unit. The cylinder 11 is supported, in turn, by a relatively rugged temperature-compensating element 14 which has the same angular deflection, per degree temperature change, as the bimetallic elements 7a, 7b, but which turns in the opposite direction on temperature changes. The element 14 is illustrated as a pair of co-axial helixes connected at their upper ends, the cylinder 11 being supported by the lower end of the inner helix and the lower end of the outer helix being secured to a stepped cylindrical base 15, preferably of insulating material.

The mechanism is housed within a multiple-walled heat-insulating casing comprising an inner cup-shaped shell 16 that is slipped over a spacing sleeve 17 on the upper section of the base 15, the upper end of the shell 16 having a central aperture in which the spacer 18 is seated. The intermediate wall comprises a cylinder 19 that fits over a flange or step of the base 15 and a cap 20 that is spaced from the shell 16 by the spacer 18. The outer wall or shell 21 is fitted over the base member 15 and has means, such as an upper flange, for connection to associated parts of the transmitter. The walls of the heat-insulating casing are preferably of polished metal and the annular space between either or both pairs of adjacent walls may be filled with material 21' such as aluminum foil for insulation and for distributing the heat along the cylindrical surfaces. Changes in ambient temperature are thus gradually and evenly distributed towards the interior of the structure, and the time-response characteristics of the heavy temperature-compensating structure 14 and of the light bimetallic elements 7a, 7b are thus practically identical so far as concerns changes in ambient temperature.

The stem 9a extends above the housing and through the central opening in an annular magnetic core 22 in which the alternating current field winding 23 is located. A core disk 24 is secured to the central portion of core 22 to leave a circumferential air gap in which, as will be presently described, the contact system of the transmitter moves. A loose guide or polished jewel bushing 25 for stem 9a is secured in the magnetic core and, above the bushing 25, the stem 9a carries a balanced contact arm 26 of hard brass or other flexible material, a pair of stop pins 27 for limiting deflection of the contact arm 26, and a current-carrying spring 28 that extends to the terminal strip 29. A contact element 30 in the form of a U-shaped strip of precious or semiprecious metal, such as palladium-silver alloy, extends into the air gap of the magnetic core and encloses a core of soft iron 31 that concentrates the radial magnetic field in the vicinity of the contact element 30.

The cooperating contacts 32, 33 are thin semi-cylindrical strips of palladium-silver alloy or the like mounted on the depending arms 34, 35, respectively, that are supported by an insulating disk 36 on the staff 5 of the measuring thermometer. The base 4 of the thermometer is secured, for example by cement, to the cover glass 37' of the casing 37 that is mounted on the magnetic core 22. Conducting springs 38, 39 extend from the contact arms 34, 35, to terminal strips 40, 41, respectively, that are supported from casing 37 by an insulating block 42.

The end of the contact member 26 serves as a pointer for indicating the temperature on a graduated scale plate 43 that is secured to the inner face of the end of the casing 37.

The terminal 29 and spring 28 form one circuit connection to the bimetallic elements 7a, 7b and the other circuit connection is through the current-conducting spring 44 that is secured to the lower end of the stem 9b, within a recess in the base 15, and is connected to an insert 45 in the base 15 into which the screw 46 is threaded. The stems 9a, 9b and the supporting sleeve 8 connect the heat-responsive elements in series between the current springs 28, 44.

The receiver unit of the motion transmitting system may be substantially identical with the portion of the transmitter unit within the heat-insulating casing, but the contact system of the transmitter is replaced, in the receiver, by a pointer 26' that is placed over a scale plate 43'.

In the schematic view of the complete system, Fig. 2, the parts of the transmitter are identified by the reference numerals applied to the corresponding physical elements of Fig. 1. For clarity of illustration, the bimetallic elements are each shown as a single helix, and the temperature-compensating elements 14 are shown below the current-responsive members 7a, 7b. The bimetallic units of the receiver are identified by reference characters 7c, 7d, respectively, and the corresponding stems by characters 9c, 9d, respectively. Other corresponding elements of the receiver are indicated by primed numerals.

As shown in Figs. 2 and 3, the bimetallic elements of the transmitter and receiver are serially arranged in a circuit which includes a source of current 47, shown diagrammatically as a battery, having one grounded terminal and its opposite terminal connected through a resistance 48, which may be adjustable as indicated, to the junction of resistors 49, 50 that extend to terminal strips 29, 41, respectively, of the transmitter. A resistor 51 is connected between the terminal strip 40 of contact arm 34 and ground. A transmission line 52 extends between terminals 45, 45' of the transmitter and receiver elements, and the series circuit is completed to ground through the current carrying spring 28' and terminal 29' of the receiver. A complete metallic circuit may, of course, be used in place of the ground return. In Fig. 3, the resistance of the connecting line to the receiver at a remote point is indicated by the lumped resistance 52. The field coil 23 of the magnetic system is energized from an alternating current source 53 that may be, and preferably is, derived from the usual 60 cycle power line.

Typical circuit constants for an embodiment of the invention will be specified before describing the method of operation, since it is apparent that the current flow established by the contact system depends upon relative magnitudes of the several resistances. In one embodiment, the bimetallic elements of the transmitter and receiver had a resistance of 5.2 ohms, resistor 48 was 27 ohms, resistor 49 was 17 ohms, resistors 50 and 51 were each 4.8 ohms and the resistance 52 of the connecting line was 12 ohms. A 15 volt direct current source 47 was used, and the alternating voltage impressed on the field coil 23 was 20 volts.

Assuming that the thermometer scales are graduated in the usual manner to increase in a clockwise direction, all bimetallic elements except the temperature-compensating elements 14, 14' are designed to produce clockwise deflections with increasing temperature. The contact pointer 26 of the transmitter and pointer 26' of the receiver aline with the same scale graduation and, with contact 30 spaced from both of the contacts 32, 33 carried by the thermometer, the current flow in the series circuit of the bimetallic elements 7ab, 7cd, is relatively low as the current must flow through the resistor 49. An engagement of contacts 30, 33 shunts the lower value resistor 50 across the resistor 49, and the current flow through the bimetallic elements is thus increased. When contacts 30, 32 engage, the current flow is shunted around the bimetallic elements as the battery circuit is completed to ground through resistor 51. The resistors 50, 51 serve to protect the contacts, and resistor 48 is a loading resistance to adjust the total resistance of the series circuit to an appropriate value.

The flow of current is controlled by the contact system of the transmitter in response to relative movement of contacts 30 and 33, the relative movement arising from a displacement of contact 33 by the prime mover or from a displacement of the contact 30 by its temperature-responsive bimetallic element. The rotary motions of the free ends of the bimetallic elements of the transmitter and receiver are simultaneous and identical since the same current flows through the bimetallic elements.

The heat-inertia of the long multiple-coil bimetallic members is negligible and the resultant high sensitivity of the members to small changes in current flow gives rise to a new method of operation. The switch contacts at the transmitter are not repeatedly opened and closed, as was the case with prior systems, to send current impulses of constant magnitude through the heating circuit. The contact 30 remains substantially continuously in engagement with the contact 33 of the prime mover system, and the contact resistance varies in accordance with the heating of the bimetallic elements 7a, 7b to effect a modulation of the heating current. It will be noted that some current flows continuously through the heating circuit through the resistor 49, and this current is adjusted to a value somewhat less than that required to heat the elements 7a, 7b to move the contact 30 away from contact 33. The current increment that tends to heat the elements to separate the contacts is supplied through the shunt path formed by the low resistance 50 and the contacts. There will be, of course, a complete separation of the contacts, and possibly a closure of contact 30 upon contact 32, if the prime mover staff 5 is quickly moved through a large scale to a lower position on the scale. The contacts do not separate during the normal use of the transmission.

The magnetic system insures the continuous movement of the contact member 26 and contact 30 by minute increments in accordance with equally minute changes in the displacement of the stems 9a, 9b. The highly concentrated magnetic field is at right angles to the electrical field at the contacts. The tendency of the contacts to stick owing to an electric charge is thus offset and the vibratory stress set up in the iron core 31 conditions the arm 26 for movement by minute torque changes. The effect of the magnetic system can be demonstrated by opening the field circuit. The movements of the contact arm 26 and pointer 26' take place as small step-by-step displacements in the absence of the alternating magnetic field, but the movements become smooth continuous displacements when the magnetic field is established at the contacts. It is therefore apparent that the magnetic field contributes materially to the variable contact resistance action and thus prevents sparking at the contacts.

The motion transmitting system shown in Fig. 1 has a high sensitivity commensurate with that of the bimetallic thermometer that is shown as the prime mover. Each of the bimetallic elements 7a, 7b was a bimetallic strip of 0.1 mm. thickness and 1.0 mm. width, with a total length of 320 mm. in the three windings. The contact member 26 was a flexible hard brass strip of 0.005 thickness and 1.5 mm. width; and the stop pins 27 limited the deflection of the contact member 26 to about 0.2 mm. The contacts 32, 33 were spaced from contact 30, when the latter was in mid-position between them, by about 0.3 mm. A transmitter unit of this type will impose substantially no load upon the pointer of a sensitive measuring instrument and will accurately follow the instrument pointer through a long range of angular displacement.

The transmitter and receiver units will usually be of identical design but this is not essential and the receiver may be designed to act as a multiplier of the prime mover displacement. The pointer of the receiver may be used for control purposes by the use of known means, such as magnetic relay contacts or a beater mechanism, for obtaining reliable contact closures with a pointer that is displaced by a relatively small torque.

It is to be understood that the invention is not restricted to the particular constructions herein shown and described, nor to the particular values specified for certain of the parts. The sensitivity of the motion transmitting apparatus may be relatively low when the prime mover is relatively insensitive. There is wide latitude in the design and construction of apparatus for operation in accordance with the spirit of my invention as set forth in the following claims.

I claim:

1. A thermo-electrical motion transmitting system comprising a heat-responsive transmitter element, a heat-responsive receiver element, serially connected resistances for heating the respective elements, a prime mover, cooperating contact members carried by said prime mover and said transmitter element, one contact member being a contact arm and the other a pair of spaced contacts at opposite sides of said contact arm, a resistor connected between the contact arm and one contact, a source of current having one terminal connected through said resistor to the associated contact, and circuit elements connecting the second terminal of said source to the second contact and to the contact arm through said serially connected heating resistances.

2. A thermo-electrical motion transmitting system as claimed in claim 1, wherein said contact arm is carried by the transmitter element.

3. A thermo-electrical motion transmitting system as claimed in claim 1, wherein said heat-responsive elements are bimetallic strips, and said strips constitute the heating resistances.

4. A thermo-electrical motion transmitting system as claimed in claim 1, wherein said heat-responsive elements comprise multiple coils of bimetallic strip material mechanically connected in series to provide cumulative rotary displacements.

5. A thermo-electrical motion transmitting system as claimed in claim 1, wherein said heat-responsive elements comprise multiple coils of bimetallic strip material mechanically connected in series to provide cumulative rotary displacements, and said multiple coils constitute the heating resistances.

6. A thermo-electrical motion transmitting system comprising a controlling and a controlled element each including a part movable in accordance with the temperature of the element, electrical heating means for said elements connected in series, a source of current and a resistance in series with said heating means, a prime mover, and contact means operative from an open position alternatively to one of two closed positions to short-circuit either said resistance or said heating elements, said contact means including contacts carried respectively by said prime mover and the movable part of said controlling element.

7. A thermo-electrical motion transmitting system as claimed in claim 6, wherein said elements are biemtallic strips of negligible heat inertia, each element constituting its own heating means, and said contacts are resilient metallic strips and engage with a contact resistance that varies with the contact pressure and correspondingly varying contact resistance; whereby the contact means will be maintained in the first of said closed positions under a varying pressure when the current flow established with the contact means in open position is not sufficient to maintain such open-position condition.

8. A thermo-electrical motion transmitting system as claimed in claim 6, in combination with means for establishing an alternating magnetic field in the space occupied by said contact means.

9. In a motion transmitting system, a heat responsive device comprising a plurality of coaxial bimetallic helixes connected in series mechanically, a support for the free end of the outer helix, a staff connected to and supported solely by the free end of the inner helix, and means including a current-carrying spring connected to said staff for passing an electric current through said helixes.

10. The invention as claimed in claim 9, in combination with a contact pointer carried by said staff, a contact on said pointer, and a cooperating contact system rotatable coaxially with said staff and including a contact at each side of said pointer contact.

11. The invention as claimed in claim 9, in combination with a contact pointer carried by said staff, a contact on said pointer and having a magnetic core, a cooperating contact system rotatable coaxially with said staff and including a contact at each side of said pointer contact, and an electromagnet for establishing a magnetic field radially of said contacts, said electromagnet comprising an annular core having an annular air gap in which said contacts are movable, and a winding within said annular core.

12. A thermo-electric distant indicating system of the type in which a prime mover controls a contact arm for regulating current flow in a circuit that includes a source of current in series with the heating resistance of a transmitter and the heating resistance of a receiver, characterized by the fact that said series circuit is conductively closed through a series current-limiting resistor, and independently of said contact arm, and said heating resistance of the transmitter is movable to actuate contacts positioned at opposite sides of said contact arm; one contact being connected to said current-limiting resistor to short circuit the same when engaged by said contact arm, and the second contact being connected to the current source to short-circuit said heating resistances when engaged by said contact arm.

13. In a thermoelectric distant indicating system, a transmitting device comprising a bimetallic member having a relatively fixed and a movable end, a resilient metallic strip contact carried by and electrically connected to the movable end of said member, a cooperating resilient metallic strip contact adapted to be connected to and displaced by a prime mover, means for establishing electrical connections to each of said contacts and to the relatively fixed end of said bimetallic member, and a resistor connected between said contacts, whereby variations in the pressure with which said contacts engage will modulate current flow in a circuit including a source of current in series with said resistor and said bimetallic member.

14. In a thermoelectric distant indicator, the invention as claimed in claim 13, in combination with a second resilient metallic strip contact carried by the movable end of said bimetallic member, said cooperating contact being positioned between the contacts carried by said bimetallic member.

15. The method of remote indication or control by a prime mover through thermally-responsive bimetallic transmitter and receiver elements, which comprises passing a heating current to said bimetallic elements in series and directly through the same, continuously modulating the heating current supplied in common to said elements to maintain the displacement imparted to the transmitter element by the heating current continuously coincident with the displacement that the prime mover tends to impart thereto.

16. The process of remote indication or control by a prime mover through thermally-responsive transmitter and receiver elements, which comprises continuously passing in series through said elements a heating current insufficient to maintain the transmitter element in that critical position into which the prime mover tends to displace the same, and continuously passing in series through said elements a current increment modulated in magnitude to supply additional heat to maintain said transmitter element continuously in that critical position.

17. The method of transferring the angular displacement of an instrument movement to a remote point by means of thermally-responsive bimetallic transmitter and receiver elements of negligible heat inertia, which comprises passing in series through said elements a current to heat said transmitter element to move a contact carried thereby into engagement with a contact carried by said instrument movement, and modulating said current continuously in accordance with the instantaneous temperature of said transmitter element to maintain the contacts in continuous engagement.

18. The method of transferring the angular displacement of an instrument movement to a remote point by means of thermally-responsive transmitter and receiver elements, which comprises passing in series through said elements a current to heat said transmitter element to move a contact carried thereby into engagement with a contact carried by said instrument movement, modulating said current continuously in accordance with the instantaneous temperature of said transmitter element to maintain the contacts in continuous engagement, imparting a mechanical vibration to one of said contacts to promote movement of the transmitter contact in response to minute changes in the temperature of the transmitter element, and establishing an alternating magnetic field in the space occupied by said contacts to suppress sparking in the event that a rapid displacement of the movement effects a separation of said contacts.

FRANZ GEORG BLOCH.

CERTIFICATE OF CORRECTION.

Patent No. 2,177,799.   October 31, 1939.

FRANZ GEORG BLOCH.

It is hereby certified that error appears in the printed specification of the above numbered patent requiring correction as follows: Page 4, first column, line 32, claim 7, for "biemtallic" read bimetallic; lines 36 and 37, same claim, strike out "and correspondingly varying contact resistance" and insert the same after "pressure", line 39, same claim 7; and that the said Letters Patent should be read with this correction therein that the same may conform to the record of the case in the Patent Office.

Signed and sealed this 5th day of December, A. D. 1939.

(Seal)

Henry Van Arsdale,
Acting Commissioner of Patents.